United States Patent
Yasukawa et al.

(10) Patent No.: US 10,791,583 B2
(45) Date of Patent: Sep. 29, 2020

(54) USER APPARATUS, MOBILE COMMUNICATION SYSTEM AND COMMUNICATION CONTROL METHOD

(71) Applicant: NTT DOCOMO, INC., Tokyo (JP)

(72) Inventors: Shimpei Yasukawa, Tokyo (JP); Satoshi Nagata, Tokyo (JP); Yongbo Zeng, Beijing (CN); Qun Zhao, Beijing (CN); Yongsheng Zhang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/564,075

(22) PCT Filed: Mar. 25, 2016

(86) PCT No.: PCT/JP2016/059677
§ 371 (c)(1),
(2) Date: Oct. 3, 2017

(87) PCT Pub. No.: WO2016/163251
PCT Pub. Date: Oct. 13, 2016

(65) Prior Publication Data
US 2018/0098369 A1    Apr. 5, 2018

(30) Foreign Application Priority Data
Apr. 9, 2015  (JP) .................................. 2015-080419

(51) Int. Cl.
*H04W 76/14*    (2018.01)
*H04W 48/10*    (2009.01)
(Continued)

(52) U.S. Cl.
CPC ........... *H04W 76/14* (2018.02); *H04W 48/10* (2013.01); *H04W 52/28* (2013.01); *H04W 72/02* (2013.01);
(Continued)

(58) Field of Classification Search
CPC ..... H04W 76/14; H04W 48/10; H04W 52/28; H04W 72/02
See application file for complete search history.

(56) References Cited

U.S. PATENT DOCUMENTS

2009/0111506 A1*  4/2009  Laroia .................. H04W 52/18
                                                    455/550.1
2012/0182907 A1*  7/2012  Li ......................... H04W 76/14
                                                    370/280
(Continued)

FOREIGN PATENT DOCUMENTS

JP    2008-310469 A    12/2008
JP    2012-157022 A    8/2012
(Continued)

OTHER PUBLICATIONS

U.S. Appl. No. 62/018,208, filed Jun. 2014, Sheng et al.*
(Continued)

*Primary Examiner* — Jael M Ulysse
(74) *Attorney, Agent, or Firm* — Osha Liang LLP

(57) ABSTRACT

A user apparatus is provided. The user apparatus is used in a mobile communication system in which D2D communications are supported. The user apparatus includes an obtaining unit configured to obtain from a base station control rules including predetermined communication methods applied to corresponding user apparatus types; a determination unit configured to determine which of the predetermined communication methods is to be applied to the user apparatus by comparing a type of the user apparatus and the control rules; and a transmission unit configured to transmit a D2D signal based on the determined predetermined communication method.

19 Claims, 11 Drawing Sheets

(51) Int. Cl.
  *H04W 52/28* (2009.01)
  *H04W 72/10* (2009.01)
  *H04W 92/18* (2009.01)
  *H04W 72/02* (2009.01)
  *H04W 48/12* (2009.01)
(52) U.S. Cl.
  CPC .......... *H04W 72/10* (2013.01); *H04W 92/18* (2013.01); *H04W 48/12* (2013.01)

(56) References Cited

U.S. PATENT DOCUMENTS

| | | | |
|---|---|---|---|
| 2012/0182962 A1* | 7/2012 | Patil | H04W 72/1205 370/330 |
| 2012/0257497 A1* | 10/2012 | Yoshimoto | H04W 72/085 370/230 |
| 2012/0314619 A1* | 12/2012 | Wiberg | H04W 74/006 370/254 |
| 2013/0114531 A1* | 5/2013 | Ahn | H04W 72/04 370/329 |
| 2013/0273926 A1* | 10/2013 | Peng | H04B 7/15528 455/450 |
| 2013/0308551 A1* | 11/2013 | Madan | H04W 72/0406 370/329 |
| 2013/0322413 A1* | 12/2013 | Pelletier | H04W 72/1289 370/336 |
| 2014/0094183 A1* | 4/2014 | Gao | H04W 72/04 455/450 |
| 2014/0187283 A1* | 7/2014 | Nimbalker | H04W 72/048 455/550.1 |
| 2014/0204847 A1* | 7/2014 | Belleschi | H04W 76/14 370/329 |
| 2014/0286293 A1* | 9/2014 | Jang | H04L 5/0051 370/329 |
| 2014/0314039 A1* | 10/2014 | Jang | H04W 76/14 370/329 |
| 2014/0328329 A1* | 11/2014 | Novlan | H04W 56/0015 370/336 |
| 2015/0009910 A1* | 1/2015 | Ryu | H04W 72/04 370/329 |
| 2015/0103789 A1* | 4/2015 | Tanaka | H04W 72/0426 370/329 |
| 2015/0215903 A1* | 7/2015 | Zhao | H04W 72/04 370/329 |
| 2015/0264716 A1* | 9/2015 | Tsai | H04W 76/14 370/329 |
| 2015/0382324 A1* | 12/2015 | Sheng | H04W 72/02 370/329 |
| 2016/0135239 A1* | 5/2016 | Khoryaev | H04W 72/04 370/329 |
| 2016/0302215 A1* | 10/2016 | Sorrentino | H04W 76/14 |

FOREIGN PATENT DOCUMENTS

| | | |
|---|---|---|
| JP | 2014-503165 A | 2/2014 |
| JP | 2016-203266 A | 8/2016 |

OTHER PUBLICATIONS

U.S. Appl. No. 62/018,208, filed Jun. 2014, Sheng; Jia.*
Office Action issued in the counterpart Japanese Patent Application No. 2017-511538, dated Oct. 16, 2018 (7 pages).
Office Action issued in the counterpart Japanese Patent Application No. 2017-511538, dated May 15, 2018 (7 pages).
Extended European Search Report issued in the counterpart European Patent Application 16776419.0, dated Mar. 2, 2018 (13 pages).
LG Electronics Inc.; "Resource pool selection with group priority"; 3GPP TSG-RAN WG2 #88, R2-145078; San Francisco, USA, Nov. 17-21, 2014 (2 pages).
Sony; "D2D Resource Allocation Mode Selection"; 3GPP TSG-RAN WG2 Meeting #85bis, R2-141300; Valencia, Spain, Mar. 31-Apr. 4, 2014 (4 pages).
InterDigital Communications; "Multiple Tx Resource Pools for ProSe Discovery"; 3GPP TSG-RAN WG2 #88, R2-145211; San Francisco, USA, Nov. 17-21, 2014 (4 pages).
InterDigital Communications; "Multiple Transmission Pools for ProSe Communications"; 3GPP TSG-RAN WG2 #88, R2-145204; San Francisco, USA, Nov. 17-21, 2014 (3 pages).
International Search Report of the International Searching Authority issued in PCT/JP2016/059677 dated Jun. 14, 2016 (5 pages).
Written Opinion of the International Searching Authority issued in PCT/JP2016/059677 dated Jun. 14, 2016 (4 pages).
3GPP TR 36.843 V12.01; "3rd Generation Partnership Project; Technical Specification Group Radio Access Network; Study on LTE Device to Device Proximity Services; Radio Aspects; (Release 12)"; Mar. 2014 (2 pages).
3GPP TS 24334 V12.2.0; "3rd Generation Partnership Project; Technical Specification Group Core Network and Terminals; Proximity-services (ProSe) User Equipment (UE) to ProSe function protocol aspects; Stage 3; (Release 12)"; Mar. 2015 (92 pages).

* cited by examiner

USER APPARATUS, MOBILE COMMUNICATION SYSTEM AND COMMUNICATION CONTROL METHOD

BACKGROUND OF THE INVENTION

1. Field of the Invention

The present invention relates to a user apparatus, a mobile communication system and a communication control method.

2. Description of the Related Art

In a mobile communication system including a current Long Term Evolution (LTE) system, in general, communications between user apparatuses are performed via a base station by having the user apparatuses communicate with the base station. However, in these days, various techniques related to Device to Device (D2D) communications are proposed in which communications are performed directly between the user apparatuses.

In particular, in the D2D communications in LTE, a "Communication" service and a "Discovery" service are proposed. In the "Communication" service, the user apparatuses perform data communications such as Voice over Internet Protocol (VoIP) communications. In the "Discovery" service, a transmission side user apparatus transmits a discovery message including its own ID or the like, and causes a reception side user apparatus to detect the transmission side user apparatus (refer to NPL 1).

In the D2D communications defined in LTE, it is proposed that a user apparatus uses a part of uplink resources predefined as resources for uplink signal transmission from a user apparatus to a base station. Further, regarding allocating resources used in D2D communications, it is also proposed that the resource allocation is assisted by a base station.

Further, in the D2D communications defined in LTE, new multiple physical channels used for the D2D communications are defined, which physical channels are different from physical channels used for communications between a base station and a user apparatus. For example, a Physical Sidelink Discovery Channel (PSDCH) is defined as a physical channel for transmitting a discovery message, and a Physical Sidelink Shared Channel (PSSCH) is defined as a physical channel for transmitting data used for communication services. Further, a Physical Sidelink Control Channel (PSCCH) used for indicating PSSCH resource allocations for a reception side user apparatus is defined. Further, a Sidelink Synchronized Signal (SLSS) used as a synchronization signal that is transmitted from a transmission side user apparatus to a reception side user apparatus is defined.

CITATION LIST

Non-Patent Literature

[NPL 1] 3GPP TR36.843 V12.0.1 (2014-03)
[NPL 2] 3GPP TS24.334 V12.2.0 (2015-03)

SUMMARY OF THE INVENTION

Technical Problem

As a user apparatus that performs D2D communications, multiple types of user apparatuses are assumed, which types are based on usage forms. For example, a user apparatus that performs as a police radio or a firefighting radio is assumed, which user apparatus is used for a usage form referred to as public safety (hereinafter, referred to as "PS"), and a user apparatus that performs other communications in general is assumed, which user apparatus is used for a usage form referred to as "Commercial". Further, in the future, it is assumed that a user apparatus will be defined used for a new usage form different from the above usage forms.

Here, in the case where a user apparatus, used for a usage form referred to as PS, performs D2D communications, it is desirable that higher priority is given to D2D communications performed by a user apparatus used for a usage form referred to as PS than to D2D communications performed by a user apparatus used for a usage form referred to as "Commercial".

However, in the current D2D communications, it is assumed that all user apparatuses share the same resources, and thus, it is not possible to give higher priority to D2D communications performed by a user apparatus of a specific type. In particular, there is a concern that, in an environment in which a small (not sufficient) amount of resources is allocated for D2D communications, or, in an environment in which there is a huge amount of user apparatuses that perform D2D communications, even if priority is given to D2D communications performed by a specific type of a user apparatus, the D2D communications may be interfered with by D2D communications performed by other types of user apparatuses.

In view of the above, the present invention has been made in order to provide a technique for appropriately controlling D2D communications according to the types of user apparatuses.

Solution to Problem

A user apparatus according to an embodiment is provided. The user apparatus is used in a mobile communication system in which D2D communications are supported. The user apparatus includes an obtaining unit configured to obtain from a base station control rules including predetermined communication methods applied to corresponding user apparatus types; a determination unit configured to determine which of the predetermined communication methods is to be applied to the user apparatus by comparing a type of the user apparatus and the control rules; and a transmission unit configured to transmit a D2D signal based on the determined predetermined communication method.

Further, a mobile communication system according to an embodiment is provided. The mobile communication system supports D2D communications and includes a user apparatus and a base station. The base station includes a transmission unit configured to transmit to the user apparatus control rules including predetermined communication methods applied to corresponding user apparatus types. The user apparatus includes an obtaining unit configured to obtain the control rules from the base station; a determination unit configured to determine which of the predetermined communication methods is to be applied to the user apparatus by comparing a type of the user apparatus and the control rules; and a transmission unit configured to transmit a D2D signal based on the determined predetermined communication method.

Further, a communication control method according to an embodiment is provided. The communication control method is performed by a user apparatus used in a mobile communication system in which D2D communications are supported. The communication control method includes obtaining from a base station control rules including predetermined communication methods applied to corresponding user apparatus types; determining which of the predetermined communication methods is to be applied to the user apparatus by comparing a type of the user apparatus and the control rules; and transmitting a D2D signal based on the determined predetermined communication method.

Advantageous Effects of Invention

According to an embodiment, a technique is provided which appropriately controls D2D communications according to a user apparatus type.

DETAILED DESCRIPTION OF THE PREFERRED EMBODIMENTS

Figure 1:
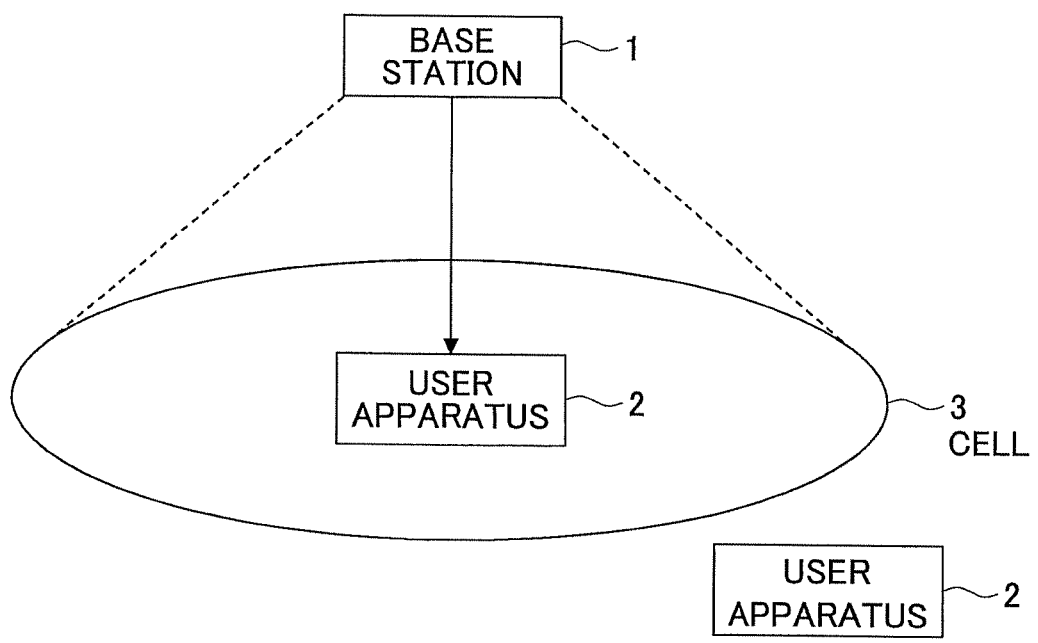
FIG. 1 is a drawing illustrating a structure of a mobile communication system according to an embodiment.

In the following, referring to the drawings, embodiments of the present invention will be described. It should be noted that the embodiments described below are merely examples and the embodiments to which the present invention is applied are not limited to the following embodiments. For example, it is assumed that a mobile communication system according to an embodiment complies with LTE standard. However, the present invention can be applied, not only to LTE, but also to other schemes. It should be noted that, in the application specification and claims, the term "LTE" is used, not only for meaning a communication method corresponding to 3GPP release 8 or 9, but also for including a communication method corresponding to 3GPP release 10, 11, 12, 13, 14 or later. It should be noted that, in the following descriptions, various signals used for D2D communications are collectively referred to as a D2D signal.

<Overview>

FIG. 1 is a drawing illustrating a structure example of a mobile communication system according to an embodiment. As illustrated in FIG. 1, a mobile communication system according to an embodiment includes a base station 1, and a user apparatus 2 that transmits and receives a D2D signal to and from the base station 1. Further, although a single cell 3 is illustrated in FIG. 1 for the sake of drawing convenience, the base station 1 may form a plurality of cells 3. Further, FIG. 1 illustrates a user apparatus 2 existing in the cell 3 and a user apparatus 2 existing outside the cell 3. The user apparatus 2 existing outside the cell 3 is an out-of-coverage terminal. It is assumed that the user apparatus 2 existing outside the cell 3 has moved to outside the cell 3 from inside the cell 3.

The base station 1, for example, allocates resource pools used for transmission and reception of a D2D signal, and allocates radio resources used by the user apparatus 2 for transmitting a D2D signal, by using broadcast (notification) information (system information), a Radio Resource Control (RRC), or the like of the cell 3. A D2D signal, transmitted and received between a transmission side user apparatus 2 and a reception side user apparatus 2, is transmitted and received by using uplink radio resources. The resource pool is an area of the uplink radio resources, which area is allocated for transmission and reception of a D2D signal.

Further, the base station 1 performs communications with the user apparatus 2 via radio. The base station 1 includes hardware resources such as a CPU including a processor, a memory apparatus including a ROM, a RAM, a flash memory, etc., an antenna used for communications with the user apparatus 2, etc., and a communication interface apparatus for communicating with an adjacent base station, etc. Functions and processes of the base station 1 may be realized by having data or programs stored in the memory device processed or executed by the processor. However, the hardware configuration of the base station 1 is not limited to the above, and the base station 1 may have any other appropriate hardware configuration.

It is assumed that a specific one of a plurality of types corresponding to a usage form of the user apparatus 2 is assigned to a user apparatus 2 according to an embodiment in advance. As an example of a type assigned to a user apparatus 2, a type corresponding to a usage form referred to as PS, and a type corresponding to a usage form referred to as Commercial can be listed. Further, a type corresponding to another usage form defined in the future is also included. The type assigned to a user apparatus 2 may be determined in advance according to a contract, etc. For example, a user apparatus 2, to which a type corresponding to a usage form referred to as PS is assigned, may have a contract with an emergency agency, etc.

It should be noted that the type assigned to a user apparatus 2 may not be necessarily based on a usage form of the user apparatus 2. In other words, a mobile communication system according to an embodiment can be applied to a case where a type assigned to a user apparatus 2 is based on any criteria.

The user apparatus 2 has a function for communicating with the base station 1, another user apparatus 2, etc., via radio. The user apparatus 2 may be, for example, a mobile phone, a smartphone, a tablet, a mobile router, a wearable terminal, etc. The user apparatus 2 may be any apparatus as long as it has a D2D communication function. The user apparatus 2 includes hardware resources such as a CPU including a processor, a memory apparatus including a ROM, a RAM, a flash memory, etc., an antenna used for communications with the base station 1, and an RF (radio frequency) apparatus, etc. Functions and processes of the user apparatus 2 may be realized by having data or programs stored in the memory device processed or executed by the processor. However, the hardware configuration of the user apparatus 2 is not limited to the above, and the user apparatus 2 may have any other appropriate hardware configuration.

According to an embodiment, the base station 1 transmits D2D communication methods corresponding to the user apparatus types to the user apparatus 2 via, for example, broadcast (notification) information of the cell 3. Upon receiving the broadcast information, the user apparatus 2 determines which of the D2D communication methods included in the broadcast information should be performed by the user apparatus 2 based on the type assigned to the user apparatus 2, and performs D2D communications with another user apparatus 2 according to the determined D2D communication method.

It should be noted that the user apparatus 2 may have multiple types. For example, a different type may be associated with a different transmission message, or, the type may be uniquely determined based on association with a transmission frequency and/or a transmission radio resource.

In a mobile communication system according to an embodiment, priority is given to D2D signal transmission of a user apparatus 2 that is positioned as a relatively high priority type by causing a user apparatus 2, which is positioned as a low priority type, to transmit a D2D signal in such a way that opportunities of data transmission are limited.

It should be noted that a user apparatus 2 to which D2D communication methods have been transmitted in advance may perform D2D communications according to the D2D communication methods transmitted in advance when the user apparatus 2 is outside the cell 3. As a method of transmitting in advance, the D2D communication methods may be transmitted by using broadcast information while the user apparatus 2 resides in the cell 3, may be transmitted separately as outside-coverage settings by using upper layer signaling, or may be preset in the terminal body or a SIM card.

<Functional Structure>

In the following, functional structure examples of the base station 1 and the user apparatus 2 which perform operations according to an embodiment will be described.

(Base Station)

Figure 2:
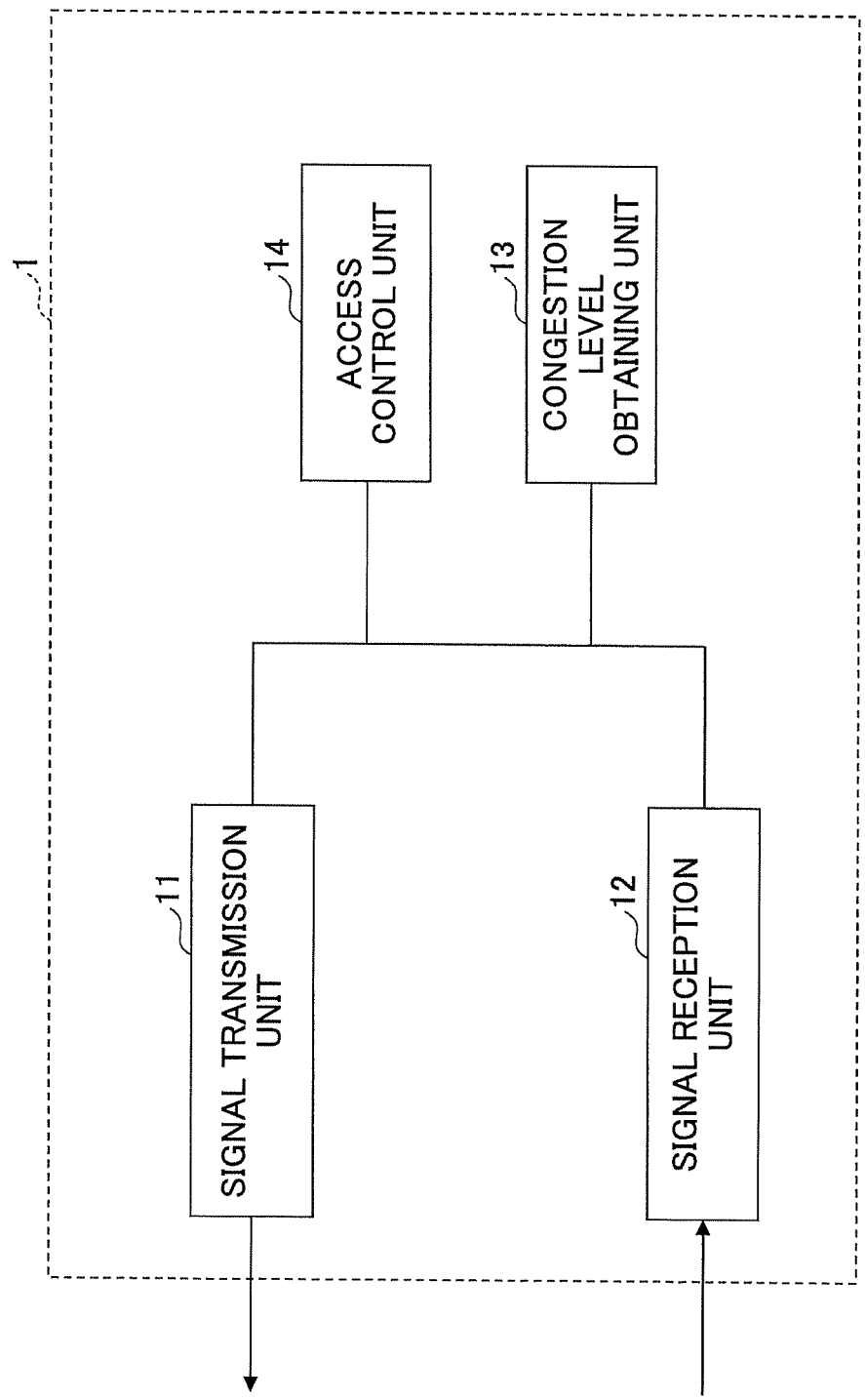
FIG. 2 is a drawing illustrating an example of a functional structure of a base station according to an embodiment.

FIG. 2 is a drawing illustrating an example of a functional structure of a base station according to an embodiment. As illustrated in FIG. 2, the base station 1 includes a signal transmission unit 11, a signal reception unit 12, a congestion level obtaining unit 13, and an access control unit 14. It should be noted that FIG. 2 illustrates functional units of the base station 1 especially related to an embodiment only, and thus, the base station 1 further includes at least functions for performing operations according to LTE (not shown in the figure). Further, a functional structure illustrated in FIG. 2 is merely an example. Functional classification and names of functional units may be anything as long as operations related to an embodiment can be performed.

The signal transmission unit 11 includes a function for wirelessly transmitting various kinds of physical layer signals generated from an upper layer signal which should be transmitted from the base station 1. The signal reception unit 12 includes a function for wirelessly receiving various kinds of signals from the user apparatus 2, and obtaining upper layer signals from the received physical layer signals.

The congestion level obtaining unit 13 obtains a congestion state (congestion level) of resources allocated for D2D communications, and determines whether opportunities of data transmission of a specific type of user apparatus 2 should be limited.

The access control unit 14 transmits broadcast information in which information indicating D2D communication methods for the user apparatuses 2 (hereinafter, referred to as "access rules") is included to the user apparatus 2 in the cell 3 according to the determination of the congestion level obtaining unit 13. It should be noted that the access control unit 14 may transmit the access rules to each user apparatus 2 by using, for example, an RRC signal. Further, for example, the access control unit 14 may transmit the access rules to each user apparatus 2 by using a response signal when an allocation request of D2D communication resource is received from the user apparatus 2.

(User Apparatus)

Figure 3:
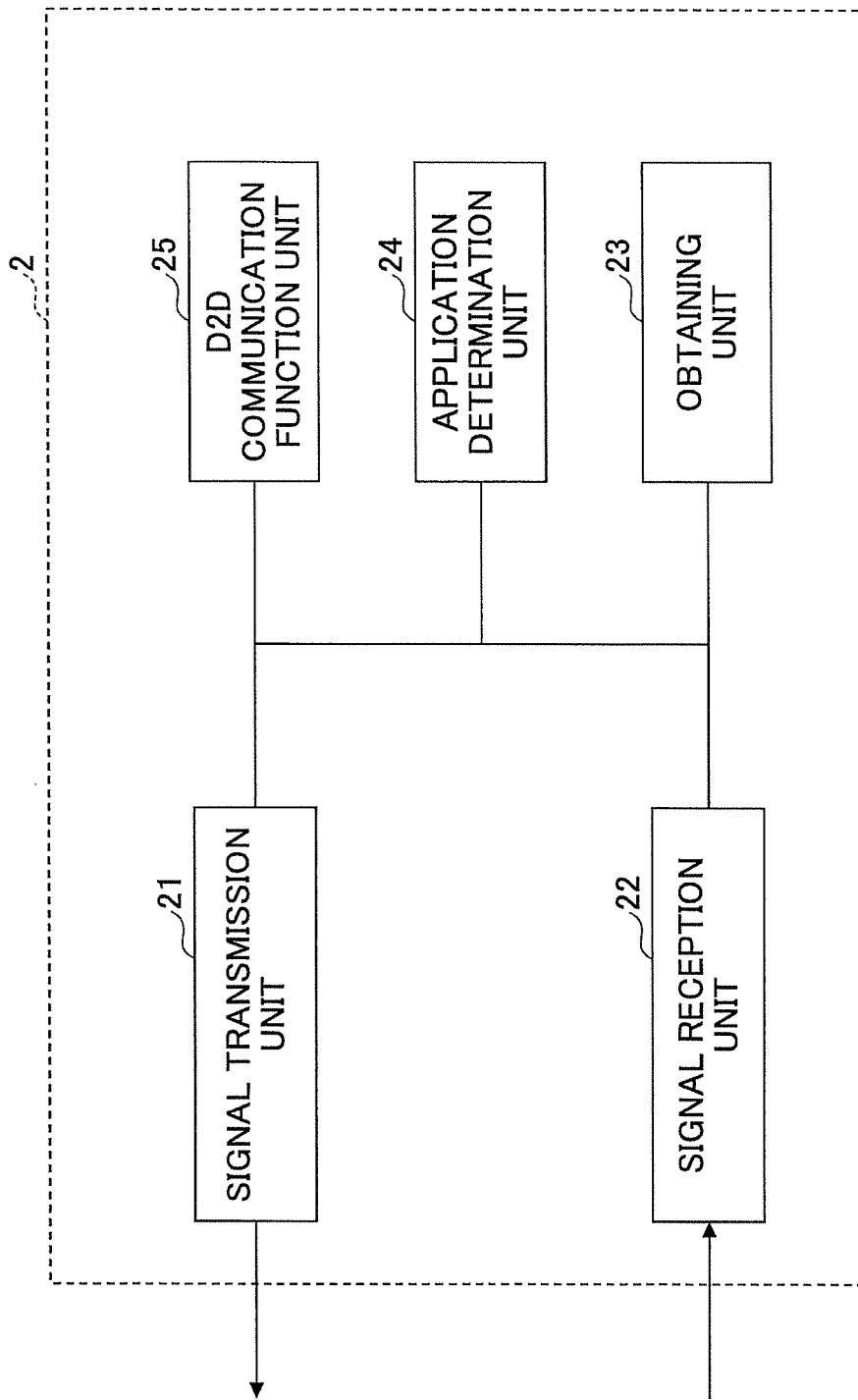
FIG. 3 is a drawing illustrating an example of a functional structure of a user apparatus according to an embodiment.

FIG. 3 is a drawing illustrating an example of a functional structure of a user apparatus 2 according to an embodiment. As illustrated in FIG. 3, the user apparatus 2 includes a signal transmission unit 21, a signal reception unit 22, an obtaining unit 23, an application determination unit 24, and a D2D communication function unit 25. It should be noted that FIG. 3 illustrates functional units of the user apparatus 2 especially related to an embodiment only, and thus, the user apparatus 2 further includes at least functions for performing operations according to LTE (not shown in the figure). Further, a functional structure illustrated in FIG. 3 is merely an example. Functional classification and names of functional units may be anything as long as operations related to an embodiment can be performed.

The signal transmission unit 21 includes a function for wirelessly transmitting various kinds of physical layer signals generated from an upper layer signal which should be transmitted from the user apparatus 2. The signal transmission unit 21 has a transmission function of D2D communications and a transmission function of cellular communications.

The signal reception unit 22 includes a function for wirelessly receiving various kinds of signals from another user apparatus 2 or the base station 1, and obtaining upper layer signals from the received physical layer signals. The signal reception unit 22 has a reception function of D2D communications and a reception function of cellular communications.

The obtaining unit 23 obtains the access rules from the broadcast information and stores them in a storage unit. Further, in the case where the access rules included in the broadcast information are updated, the obtaining unit 23 obtains the updated access rules and stores them in the storage unit. It should be noted that the obtaining unit 23 may obtain the access rules from a resource allocation signal for D2D communications including an RRC signal or the like transmitted from the base station 1.

Further, the obtaining unit 23 obtains a type of the user apparatus 2 according to a message from a network, or, according to information stored in a SIM (Subscriber Identity Module). In the case where a type of the user apparatus 2 is determined according to a contract, the type of the user apparatus 2 may be transmitted from the network according to, for example, authentication processing or the like performed at the time of "attach".

The application determination unit 24 determines which of the access rules is to be applied to the user apparatus 2 by comparing a type of the user apparatus 2 and the access rules received from the base station 1.

It should be noted that, in the case where it is specified that the application determination unit 24 should determine whether an access rule of the user apparatus 2 is to be applied to the user apparatus 2 or not according to a congestion state (congestion level) of resources allocated for D2D communications, the application determination unit 24 may measure the congestion state (congestion level) of the resources allocated for D2D communications, and may determine whether the access rule is to be applied to the user apparatus 2 or not based on the measurement result.

The D2D communication function unit 25 transmits a D2D signal according to the access rule applied to the user apparatus 2.

The above-described functional structures of the base station 1 and the user apparatus 2 may be realized entirely by a hardware circuit (e.g., one or more IC chips), or may be realized partially by a hardware circuit and the remaining part may be realized by a CPU and programs.

(Base Station)

Figure 4:
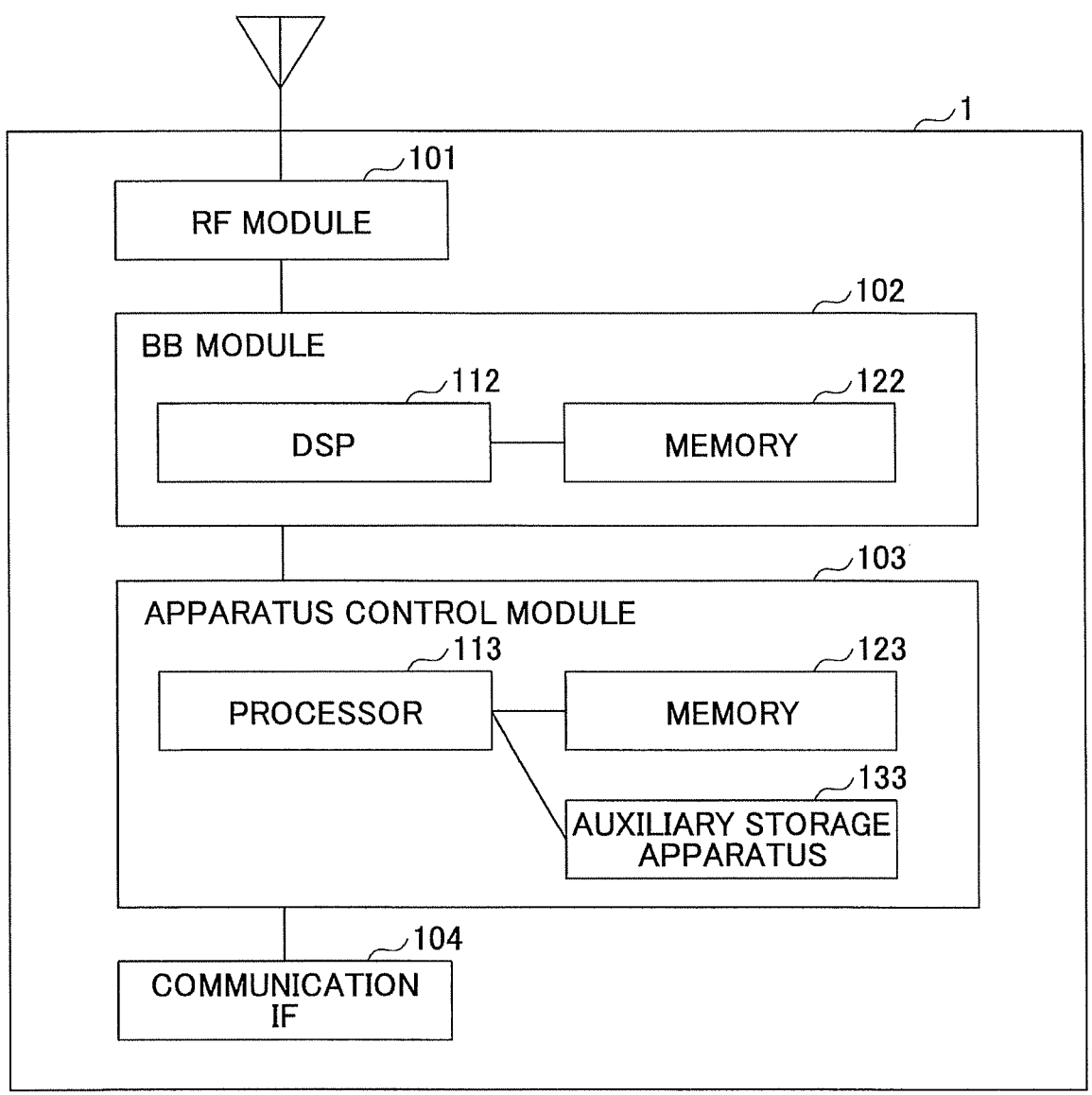
FIG. 4 is a drawing illustrating an example of a hardware configuration of a base station according to an embodiment.

FIG. 4 is a drawing illustrating an example of a hardware configuration of a base station 1 according to an embodiment. FIG. 4 illustrates a structure closer to an implementation example compared to FIG. 2. As illustrated in FIG. 4, the base station 1 includes an RF (Radio Frequency) module 101 for performing a process related to a radio signal, a BB (Base Band) processing module 102 for performing baseband signal processing, an apparatus control module 103 for performing a process of an upper layer, etc., and a communication IF 104 as an interface for connecting to a network.

The RF module 101 generates a radio signal to be transmitted from an antenna by performing D/A (digital-to-analog) conversion, modulation, frequency conversion, power amplification, etc., for a digital baseband signal received from the BB processing module 102. Further, the RF module 101 generates a digital baseband signal by performing frequency conversion, A/D (analog to digital) conversion, demodulation, etc., for a received radio signal, and transmits the generated signal to the BB processing module 102. The RF module 101 includes, for example, a part of the signal transmission unit 11 and a part of the signal reception unit 12 illustrated in FIG. 2.

The BB processing module 102 performs a process of converting bidirectionally between an IP packet and a digital baseband signal. A DSP (Digital Signal Processor) 112 performs signal processing in the BB processing module 102. A memory 122 is used as a work area of the DSP 112. The BB processing module 102 includes, for example, a part of the signal transmission unit 11 and a part of the signal reception unit 12 illustrated in FIG. 2.

The apparatus control module 103 performs an IP layer protocol process, an OAM (Operation and Maintenance) process, etc. A processor 113 performs processing for the apparatus control module 103. A memory 123 is used as a work area of the processor 113. An auxiliary storage apparatus 133 is, for example, an HDD, etc., and stores various types of setting information items, etc., used for operations of the base station 1. The apparatus control module 103 includes, for example, the congestion level obtaining unit 13 and the access control unit 14 illustrated in FIG. 2.

(User Apparatus)

Figure 5:
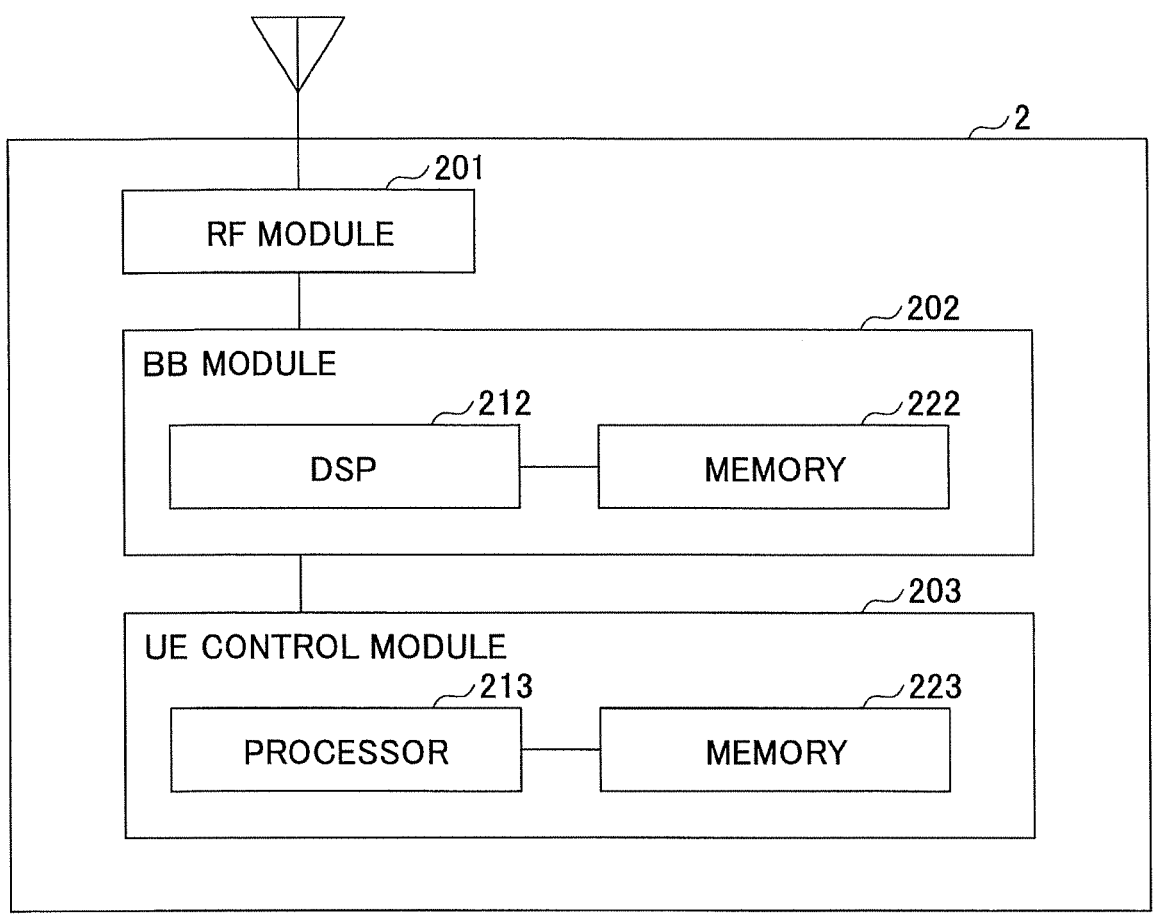
FIG. 5 is a drawing illustrating an example of a hardware configuration of a user apparatus according to an embodiment.

FIG. 5 is a drawing illustrating an example of a hardware configuration of a user apparatus 2 according to an embodiment. FIG. 5 illustrates a structure closer to an implementation example compared to FIG. 3. As illustrated in FIG. 5, the user apparatus 2 includes an RF module 201 for performing a process related to a radio signal, a BB processing module 202 for performing baseband signal processing, and a UE control module 203 for performing a process of an upper layer, etc.

The RF module 201 generates a radio signal to be transmitted from an antenna by performing D/A conversion, modulation, frequency conversion, power amplification, etc., for a digital baseband signal received from the BB processing module 202. Further, the RF module 201 generates a digital baseband signal by performing frequency conversion, A/D conversion, demodulation, etc., for a received radio signal, and transmits the generated signal to the BB processing module 202. The RF module 201 includes, for example, a part of the signal transmission unit 21 and a part of the signal reception unit 25, and a part of the D2D communication function unit 25 illustrated in FIG. 3.

The BB processing module 202 performs a process of converting bidirectionally between an IP packet and a digital baseband signal. A DSP 212 performs signal processing in the BB processing module 202. A memory 222 is used as a work area of the DSP 212. The BB processing module 202 includes, for example, a part of the signal transmission unit 21, a part of the signal reception unit 22, and a part of the D2D communication function unit 25 illustrated in FIG. 3.

The UE control module 203 performs an IP layer protocol process, processes of various types of applications, etc. A processor 213 performs processing for the UE control module 203. A memory 223 is used as a work area of the processor 213. The UE control module 203 includes, for example, the obtaining unit 23 and the application determination unit 24 illustrated in FIG. 3.

<Processing Steps>

(Processing Sequence)

Figure 6:
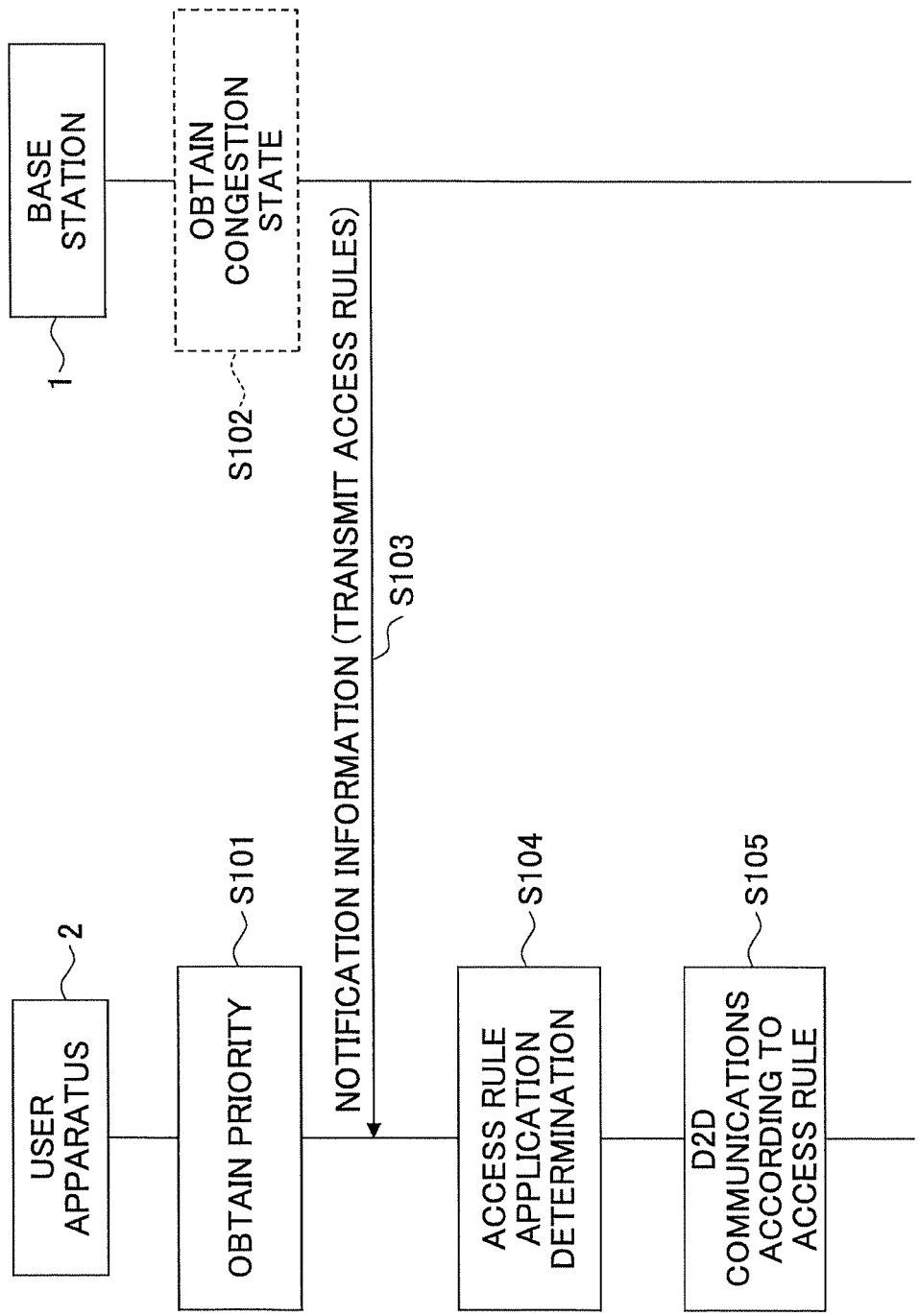
FIG. 6 is a sequence diagram illustrating an example of processing steps performed by a mobile communication system according to an embodiment.

FIG. 6 is a sequence diagram illustrating an example of processing steps performed by a mobile communication system according to an embodiment.

In step S101, the obtaining unit 23 of the user apparatus 2 obtains a type of the user apparatus 2 according to a message from a network, or, according to information stored in the SIM, and stores the type in a storage unit.

In step S102, the congestion level obtaining unit 13 of the base station 1 obtains a congestion state (congestion level) of resources allocated for D2D communications, and determines whether opportunities of data transmission of a specific type of user apparatuses 2 should be limited. The congestion level obtaining unit 13 may determine the congestion state of the resources based on a state in which the resources are allocated to D2D communication resource pools, or may determine the resource congestion state based on a report from the user apparatus 2. For example, the user apparatus 2 may transmit quality information similar to an RSRP or an RSRQ to the base station 1 by using a measurement signal (DM-RS (Demodulation Reference Signal)), etc., included in a D2D synchronization signal (PSSS (Primary Sidelink Synchronization Signal), SSSS (Secondary Sidelink Synchronization Signal)) or a PSDCH (Physical Sidelink Discovery Channel).

In the case where it is determined that the data transmission opportunities should be limited, the congestion level obtaining unit 13 transmits an access rule to the user apparatus 2 according to the processing steps of step S103. It should be noted that a mobile communication system according to an embodiment may omit the processing steps of step S102, and may perform processing steps of step S103 regardless of the congestion state of the resources allocated for D2D communications.

In step S103, the access control unit 14 and the signal transmission unit 11 of the base station 1 sets the access rules in a SIB (System Information Block) of broadcast information, and transmits the set result to the user apparatus 2. It should be noted that the access control unit 14 and the signal transmission unit 11 of the base station 1 may transmit the access rules to the user apparatus 2 via an RRC signal, etc. The obtaining unit 23 of the user apparatus 2 stores the obtained access rules in the storage unit.

In step S104, the application determination unit 24 of the user apparatus 2 determines whether there exists an access rule that should be applied to the user apparatus 2 by comparing the type of the user apparatus 2 obtained in step S101 and the access rules received in step S103.

It should be noted that, in the case where it is specified that the application determination unit 24 of the user apparatus 2 should determine whether an access rule of the user apparatus 2 is to be applied to the user apparatus 2 or not according to a congestion state (congestion level) of resources allocated for D2D communications, the application determination unit 24 may measure the congestion state (congestion level) of the resources allocated for D2D communications, and may determine that an access rule is to be applied to the user apparatus 2 in the case where the measurement result is greater than a predetermined threshold value. The application determination unit 24 may estimate the congestion state from, for example, a reception level of a D2D synchronization signal (PSSS, SSSS), or, may estimate the congestion state from a reception level of a measurement signal (DM-RS) included in a PSDCH in the case where a discovery message is transmitted via the PSDCH. Further, a bit may be included in the access rules, which bit is used for indicating that the access rules should be applied in the case where the congestion state of the resources allocated for D2D communications is greater than a predetermined threshold value.

In step S105, the D2D communication function unit 25 of the user apparatus 2 transmits a D2D signal based on the access rule applied to the user apparatus 2.

It should be noted that there may be a case where the access rules included in the broadcast information are changed. Therefore, the processing steps of S102 to S105 may be performed repeatedly.

(D2D Communication Method Based on Access Rules)

Next, a D2D communication method will be described in detail, which method is performed by the user apparatus 2 according to the processing steps of S104 and S105 based on the access rules transmitted to the user apparatus 2 from the base station 1 in the processing steps of step S103.

[D2D Communication Method (No. 1)]

In a D2D communication method (No. 1), resource pools for D2D communications are divided along the time axis, and a range of available resource pools is limited according to a type of the user apparatus 2.

Figure 7:
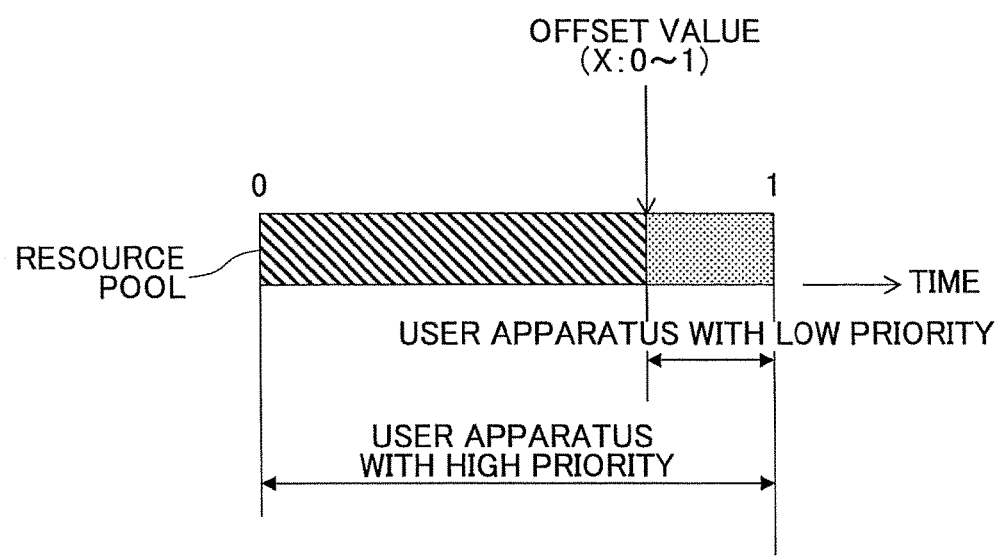
FIG. 7 is a drawing illustrating a D2D communication method (No. 1).

FIG. 7 is a drawing illustrating the D2D communication method (No. 1). As illustrated in FIG. 7, it is assumed that the starting point of the resource pools is "0" and the ending point of the resource pools is "1". The resource pools are divided by a predetermined offset value (0-1). Next, with respect to a user apparatus 2 of a high priority type, a range of all resources is permitted for D2D communications, and, with respect to a user apparatus 2 of a low priority type, only a range of the resource pools from a point indicated by the offset value to the ending point is permitted for D2D communications.

It should be noted that the resource pools illustrated in FIG. 7 may be, for example, resource pools for PSDCH, or resource pools for PSCCH and PSSCH.

Further, in FIG. 7, it is assumed that there are two types (high priority, low priority) in the user apparatus types. However, two or more offset values may be provided and the resource pools may be divided into three or more portions so that a case can be handled in which there are three or more types in the types of the user apparatuses 2.

In the D2D communication method (No. 1), for example, types of the user apparatus 2 and offset values indicating D2D communication available ranges are associated with access rules transmitted in the processing steps of step S103 of FIG. 6, and the associated result is stored.

In the case where the application determination unit 24 of the user apparatus 2 determines that an offset value corresponding to the type of the user apparatus 2 is stored in the access rules in the processing steps of step S104, the D2D communication function unit 25 of the user apparatus 2 transmits a D2D signal in a range of the resource pools specified by the offset value in the processing steps of step S105.

[D2D Communication Method (No. 2)]

In a D2D communication method (No. 2), different values are set as probabilities of performing D2D signal transmission according to types of the user apparatuses 2.

Figure 8:
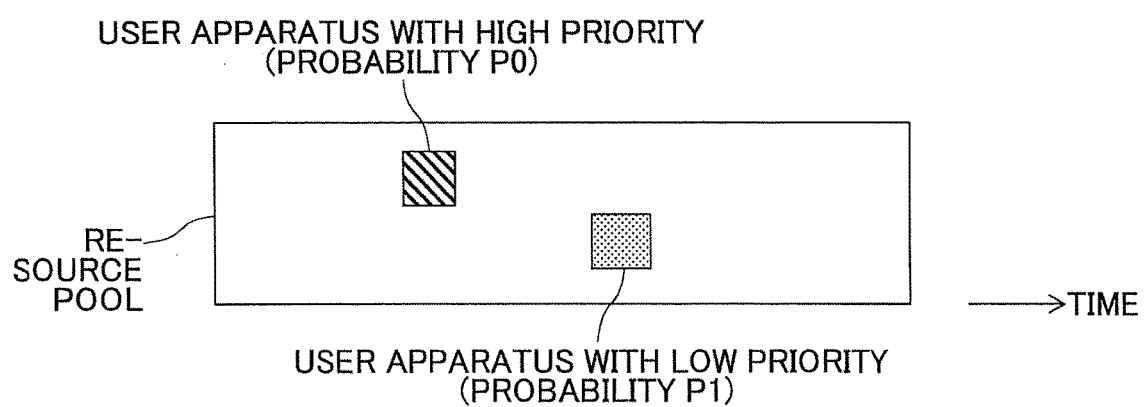
FIG. 8 is a drawing illustrating a D2D communication method (No. 2).

FIG. 8 is a drawing illustrating the D2D communication method (No. 2). For example, a user apparatus 2 of a high priority type includes a D2D signal in a predetermined resource block and transmits the resource block with probability P0, and a user apparatus 2 of a low priority type includes a D2D signal in a predetermined resource block and transmits the resource block with probability P1. Further, it is assumed that probability P0>probability P1.

Here, in the case where the user apparatus 2 transmits a discovery message via PSDCH, there are two defined communication methods referred to as type 1 and type 2. In type 2, the base station 1 allocates a PSDCH resource for the user apparatus 2. In type 1, the user apparatus 2 randomly allocates a PSDCH resource.

In the case of a communication method referred to as type 1, the user apparatus 2 randomly allocates a resource. Therefore, there is a possibility that the same resource is selected by a plurality of user apparatuses 2 and that interference is created. Therefore, it is expected that the probability, with which a D2D signal transmitted by a user apparatus 2 of a low priority type interferes with a D2D signal transmitted by a user apparatus 2 of a high priority type, will be decreased by setting the probability P1, with which the user apparatus 2 of a low priority type performs D2D signal transmission, low.

Further, even in the case of a communication method referred to as type 2, resources orthogonal to each other may not be allocated for the user apparatuses 2. Therefore, similar to the communication method referred to as type 1, it is expected that the probability, with which a D2D signal transmitted by a user apparatus 2 of a low priority type interferes with a D2D signal transmitted by a user apparatus 2 of a high priority type, will be decreased by setting the probability P1, with which the user apparatus 2 of a low priority type performs D2D signal transmission, low. Further, an effect will be also expected in which inter-cell interference is reduced.

Further, in the D2D communication method (No. 2), for example, it is possible not to permit a user apparatus 2 of a low priority type to perform D2D communications by setting the transmission probability P1 of the user apparatus 2 of a low priority type as "0".

It should be noted that, in FIG. 8, it is assumed that there are two types (high priority, low priority) in the types of the user apparatuses 2. However, the D2D communication method (No. 2) can be applied to a case in which there are three or more types in the types of the user apparatuses 2.

In the D2D communication method (No. 2), for example, types of the user apparatuses 2 and transmission probabilities of D2D signal transmission are associated with access rules transmitted in the processing steps of step S103 of FIG. 6, and the associated result is stored.

In the case where the application determination unit 24 of the user apparatus 2 determines that a transmission probability corresponding to the type of the user apparatus 2 is included in the access rules in the processing steps of step S104, the D2D communication function unit 25 of the user apparatus 2 transmits a D2D signal with the specified transmission probability in the processing steps of step S105.

[D2D Communication Method (No. 3)]

In a D2D communication method (No. 3), resource pools for D2D communications are divided along the time axis or along the frequency axis, and ranges of available resource pools are specified for each type of the user apparatus 2.

Figure 9:
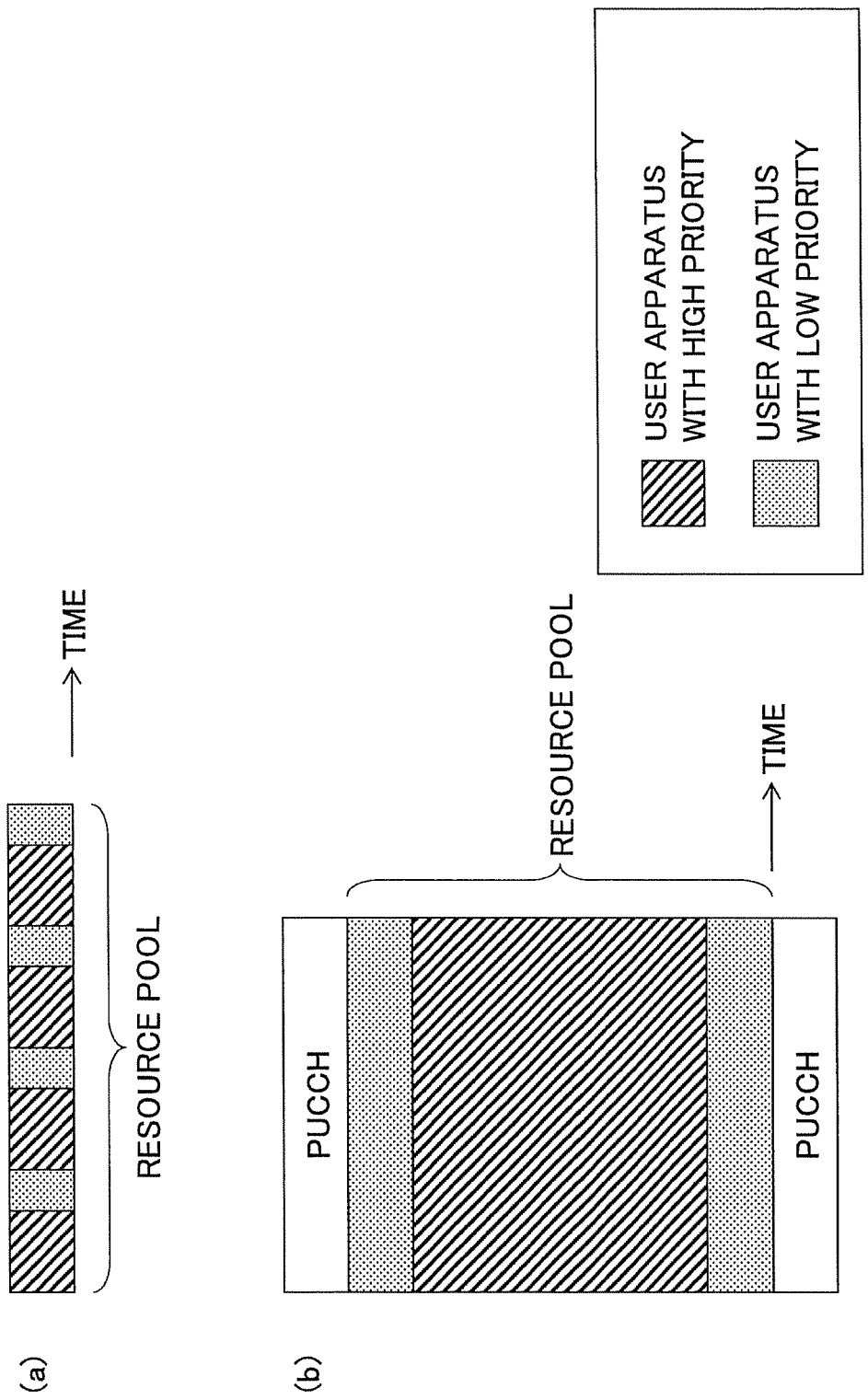
FIG. 9 is a drawing illustrating a D2D communication method (No. 3).

FIG. 9 is a drawing illustrating the D2D communication method (No. 3). FIG. 9(a) illustrates an example of a case in which the resource pools are divided along the time axis. FIG. 9(b) illustrates an example of a case in which the resource pools are divided along the frequency axis. In the example of FIG. 9, ranges of resource pools available for a user apparatus 2 of a high priority type are set to be wider than ranges of resource pools available for a user apparatus 2 of a low priority type. It is possible for a user apparatus 2 of a high priority type to transmit a D2D signal without interference with a D2D signal transmitted by a user apparatus 2 of a low priority type by separating the ranges of available resource pools according to the types of the user apparatuses 2 as illustrated in FIG. 9.

It should be noted that, in FIG. 9, it is assumed that there are two types (high priority, low priority) in the types of the user apparatuses 2. However, the D2D communication method (No. 3) can be applied to a case in which there are three or more types in the types of the user apparatuses 2. In the case where there are three or more types in the types of the user apparatuses 2, the resource pool ranges may be separated according to the number of types of the user apparatuses 2.

In the D2D communication method (No. 3), for example, types of the user apparatuses 2 and resource pool ranges (resource dividing patterns) indicating D2D communication available ranges are associated with corresponding access rules transmitted in the processing steps of step S103 of FIG. 6, and the associated result is stored.

In the case where the application determination unit 24 of the user apparatus 2 determines that resource pool ranges corresponding to the type of the user apparatus 2 are included in the access rules in the processing steps of step S104, the D2D communication function unit 25 of the user apparatus 2 transmits a D2D signal in the specified resource pool ranges in the processing steps of step S105.

[D2D Communication Method (No. 4)]

In a D2D communication method (No. 4), the numbers of repetitions of D2D signal transmissions are set to be different from each other according to the types of the user apparatuses 2. Here, in D2D communications, it is specified that a D2D signal transmitted via PSDCH and a D2D signal transmitted via PSSCH are repeatedly transmitted for four times at most. Therefore, in the D2D communication method (No. 4), for example, the number of repetitions of D2D signal transmissions for a user apparatus 2 of a low priority type is limited to maximum two.

Figure 10:
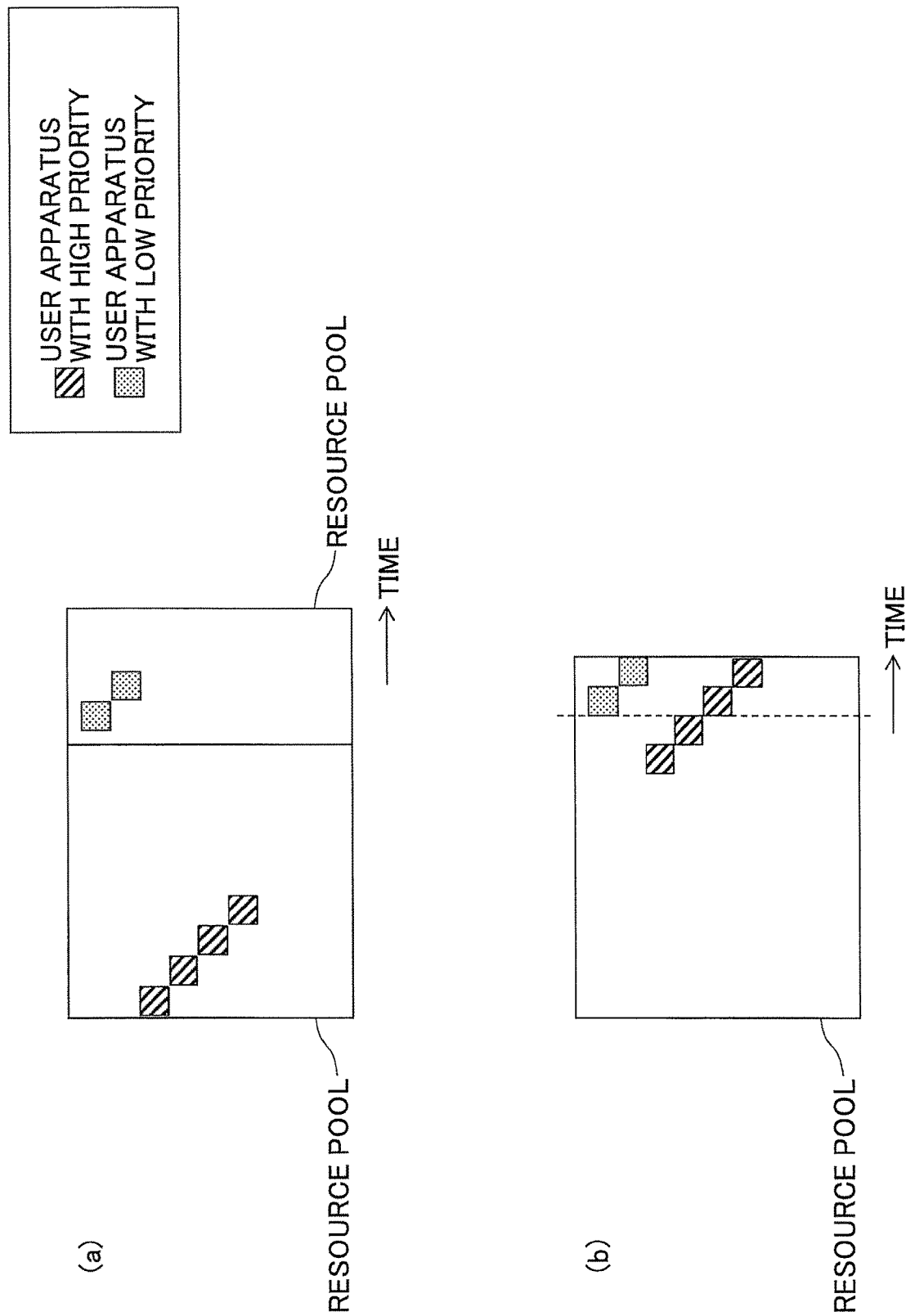
FIG. 10 is a drawing illustrating a D2D communication method (No. 4).

FIG. 10 is a drawing illustrating the D2D communication method (No. 4). FIG. 10(a) illustrates a state in which, in the case where the resource pools are divided into a resource pool available for transmission by a user apparatus 2 of a high priority type and a resource pool available for transmission by a user apparatus 2 of a low priority type, the user apparatus 2 of a high priority type and the user apparatus 2 of a low priority type repeatedly transmit D2D signals. FIG. 10(b) illustrates a state in which, in the case where the resource pool available for transmission by a user apparatus 2 of a low priority type is limited, the user apparatus 2 of a high priority type and the user apparatus 2 of a low priority type repeatedly transmit D2D signals.

The resources used for D2D signal transmission by a user apparatus 2 of a low priority type are decreased by limiting the maximum number of repetitions of D2D signal transmissions according to the types of the user apparatuses 2 as illustrated in D2D communication method (No. 4), and thus, the resources available for D2D signal transmission by a user apparatus 2 of a high priority type are relatively increased.

It should be noted that, in FIG. 10, it is assumed that there are two types (high priority, low priority) in the types of the user apparatuses 2. However, the D2D communication method (No. 4) can be applied to a case in which there are three or more types in the types of the user apparatuses 2. In the case where there are three or more types in the types of the user apparatuses 2, the maximum number of repetitions of D2D signal transmissions may be specified according to the types of the user apparatuses 2.

In the D2D communication method (No. 4), for example, types of the user apparatuses 2 and maximum numbers of repetitions of D2D transmissions are associated with access rules transmitted in the processing steps of step S103 of FIG. 6, and the associated result is stored.

In the case where the application determination unit 24 of the user apparatus 2 determines that a maximum number of repetitions of D2D signal transmissions corresponding to the type of the user apparatus 2 is included in the access rules in the processing steps of step S104, the D2D communication function unit 25 of the user apparatus 2 transmits D2D signals repeatedly in a range of the specified maximum number of repetitions in the processing steps of step S105.

[D2D Communication Method (No. 5)]

In a D2D communication method (No. 5), transmission power parameters can be independently specified according to the types of the user apparatuses 2.

For example, a transmission power parameter ($P_0$, $\alpha$) indicated for a user apparatus 2 of a high priority type and a transmission power parameter ($P_0$, $\alpha$) indicated for a user apparatus 2 of a low priority type are independently specified in such a way that the transmission power of the user apparatus 2 of a low priority type is suppressed, and thus, interference with the user apparatus 2 of a high priority type is decreased. It should be noted that maximum transmission power or a transmission power offset may be specified instead of the transmission power parameter ($P_0$, $\alpha$), or, two or more parameters of the transmission power parameter ($P_0$, $\alpha$), the maximum transmission power and the transmission power offset may be specified.

It should be noted that the D2D communication method (No. 5) can be applied to a case where there are three or more types in the types of the user apparatuses 2.

In the D2D communication method (No. 5), for example, types of the user apparatuses 2 and transmission power parameters are associated with access rules transmitted in the processing steps of step S103 of FIG. 6, and the associated result is stored.

In the case where the application determination unit 24 of the user apparatus 2 determines that a transmission power parameter corresponding to the type of the user apparatus 2 is included in the access rules in the processing steps of step S104, the D2D communication function unit 25 of the user apparatus 2 transmits a D2D signal according to the specified transmission power parameter in the processing steps of step S105.

Further, in the case where transmissions of D2D signals of different priorities collide with each other in time domain (in the case where subframes are the same, or in the case where subframes are partially overlapped), the user apparatus 2 may give priority to the transmission of a D2D signal of higher priority. For example, there may be a case in which the user apparatus 2 preferentially allocates the transmission power to the transmission of a D2D signal of higher priority, and thus, transmits another D2D signal by using remaining power or stops (drops) transmission of a D2D signal of low priority. Similarly, also in the case where a pair of transmission and reception of D2D signals of different priorities collide with each other in time domain, the user apparatus 2 may give priority to transmission or reception of a D2D signal of higher priority, and may perform reception or transmission of another D2D signal only in the case where the user apparatus 2 has capability to do so. The above arrangement is applied not only to a case where transmission and reception of multiple D2D signals are performed in the same carrier, but also to a case where transmission and reception of D2D signals are performed in multiple carriers.

As shown above, the D2D communication methods (No. 1) to (No. 5) have been described. Two or more of the D2D communication methods (No. 1) to (No. 5) may be combined. For example, the D2D communication method (No. 1) and the D2D communication method (No. 4) may be combined, or, the D2D communication method (No. 3) and the D2D communication method (No. 4) may be combined. In a mobile communication system according to an embodiment, it is possible to appropriately control D2D communications according to the type of the user apparatus 2 by combining the D2D communication methods in various ways.

Further, in the case where the D2D communication methods (No. 1) to (No. 5) are applied to a PSCCH and a PSSCH, the access rules may be applied to a PSCCH and a PSSCH in common. For example, in the case where the D2D communication method (No. 2) is applied to a PSCCH and a PSSCH, in order to avoid a situation in which a PSCCH is transmitted but a PSSCH is not transmitted, a D2D signal may be transmitted in the PSSCH transmission regardless of the specified transmission probability.

(Priority Control for Each Resource Pool)

In a mobile communication system according to an embodiment, available resource pools may be limited (or specified) for each user apparatus 2.

Figure 11:
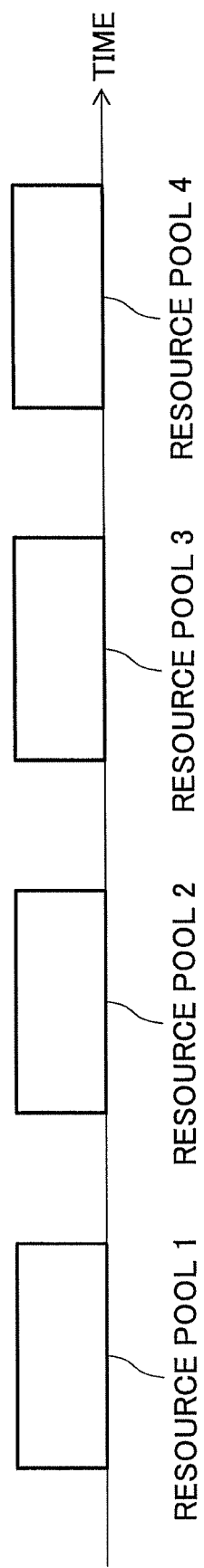
FIG. 11 is a drawing illustrating a plurality of resources allocated for D2D communications.

FIG. 11 is a drawing illustrating a plurality of resource pools allocated for D2D communications. For example, in the case where there exist a plurality of resource pools (1-4) as illustrated in FIG. 11, a user apparatus 2 of a high priority type may be permitted to use all of the resource pools (1-4) for D2D communications, and a user apparatus 2 of a low priority type may be permitted to use only a limited part of the resource pools (e.g., 1 and 3) for D2D communications. Further, as another example, in the case where three or more types of the user apparatuses 2 are specified, the resource pools may be assigned to corresponding types of the user apparatuses 2 that are permitted to use the resource pools for D2D communications.

In the case where priority control is performed for each resource pool, types of the user apparatuses 2 are associated with identifiers used for identifying resource pools permitted to be used for D2D communications, and the associated result may be included in the broadcast information transmitted in the processing steps of step S103 of FIG. 6.

In the case where the application determination unit 24 of the user apparatus 2 determines that an identifier used for identifying a resource pool corresponding to the type of the user apparatus 2 is included in the broadcast information in the processing steps of step S104, the D2D communication function unit 25 of the user apparatus 2 may transmit a D2D signal by using the specified resource pool in the processing steps of step S105.

It should be noted that the priority control for each resource pool may be combined with the above-described D2D communication methods (No. 1) to (No. 5). In a mobile communication system according to an embodiment, it is possible to appropriately control D2D communications according to the type of the user apparatus 2 by combining the D2D communication methods in various ways.

(Regulation Control of D2D Communications)

In a mobile communication system according to an embodiment, the access control unit 14 of the base station 1 may include regulation information in the broadcast information and transmit the included result to the user apparatus 2. In the regulation information, types of the user apparatuses 2 are associated with signals used for regulating the D2D communications.

The application determination unit 24 of the user apparatus 2, which has received the regulation information, may compare the type of the user apparatus 2 with the regulation information to determine whether the type of the user apparatus 2 is a regulation target. In the case where it is determined that the type of the user apparatus 2 is a regulation target (that the D2D communications are not permitted), the D2D communication function unit 25 of the user apparatus 2 may not transmit a D2D signal.

With the above arrangement, it is possible for a mobile communication system according to an embodiment to avoid congestion that occurs in the normal radio communications (cellular communications) performed by a macro cell.

It should be noted that the regulation control of D2D communication may be combined with the above-described D2D communication methods (No. 1) to (No. 5) and the priority control for each resource pool.

(Synchronization Signal Transmission Opportunity Control)

In a mobile communication system according to an embodiment, synchronization signal transmission opportunities and/or transmission power settings may be specified for each type of the user apparatuses 2.

Figure 12:
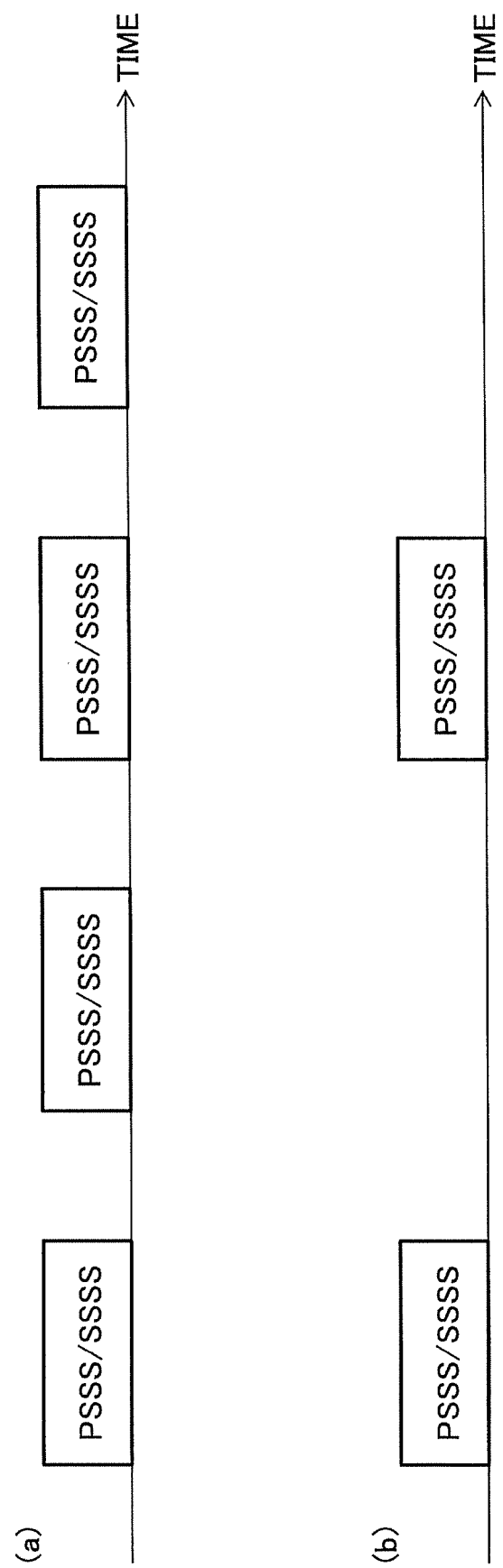
FIG. 12 is a drawing illustrating a state in which synchronization signals are repeatedly transmitted.

FIG. 12 is a drawing illustrating a state in which synchronization signals are repeatedly transmitted. For example, in a mobile communication system according to an embodiment, a user apparatus 2 of a high priority type may transmit synchronization signals at a predetermined subframe interval as illustrated in FIG. 12 (*a*) and a user apparatus 2 of a low priority type may transmit synchronization signals at an interval less than that of the user apparatus 2 of a high priority type as illustrated in FIG. 12 (*b*).

In the case where synchronization signal transmission opportunity control is performed, types of the user apparatuses 2 are associated with synchronization signal transmission intervals, and the associated result may be included in the broadcast information transmitted in the processing steps of step S103 of FIG. 6.

Alternatively, a user apparatus 2 of a low priority type may transmit synchronization signals only within periods of "Communication" or "Discovery" performed by the user apparatus 2 of a low priority type.

In the case where the application determination unit 24 of the user apparatus 2 determines that the synchronization signal transmission interval corresponding to the type of the user apparatus 2 is included in the broadcast information, the D2D communication function unit 25 of the user apparatus 2 may transmit synchronization signals at the specified transmission interval.

Effect

As described above, according to an embodiment, a user apparatus is provided. The user apparatus is used in a mobile communication system in which D2D communications are supported. The user apparatus includes an obtaining unit configured to obtain from a base station control rules including predetermined communication methods applied to corresponding user apparatus types; a determination unit configured to determine which of the predetermined communication methods is to be applied to the user apparatus by comparing a type of the user apparatus and the control rules; and a transmission unit configured to transmit a D2D signal based on the determined predetermined communication method.

A technique is provided by the user apparatus 2, which technique appropriately controls D2D communications according to the user apparatus type.

Further, the determination unit may further determine whether the predetermined communication method is applied to the user apparatus 2 by comparing a congestion level of D2D communication resources used by the user apparatus for communications with a predetermined threshold value. With the above arrangement, it is possible to restrict D2D communications of the user apparatus 2 only in the case where the D2D communication resources are insufficient.

Further, in the predetermined communication method, available ranges of resources of predetermined resource pools used for D2D communications permitted to be used by corresponding types of the user apparatuses may be different from each other, the determination unit may determine the range of resources of the predetermined resource pools permitted to be used by the user apparatus, and the transmission unit may transmit a D2D signal within the range of resources permitted to be used.

With the above arrangement, for example, it is possible to reduce a risk in which a D2D signal transmitted by a user apparatus 2 of a high priority type is interfered with by a D2D signal transmitted by a user apparatus 2 of a low priority type by separating the ranges of available resource pools according to the types of the user apparatuses 2.

Further, in the predetermined communication method, D2D signal transmission probabilities applied to the corresponding types of the user apparatuses are different from each other, the determination unit may determine the D2D signal transmission probability applied to the user apparatus, and the transmission unit may transmit a D2D signal with the applied transmission probability.

With the above arrangement, it is possible to decrease probability of having a D2D signal transmitted by a user apparatus 2 of a high priority type interfered with by a D2D signal transmitted by a user apparatus 2 of a low priority type by setting a probability, with which a user apparatus of a low priority type transmits a D2D signal, lower than that of a user apparatus of a high priority type.

Further, in the predetermined communication method, the numbers of repeated D2D signal transmissions for corresponding types of the user apparatuses may be different from each other, the determination unit may determine the applied number of repeated D2D signal transmissions, and the transmission unit may repeatedly transmit D2D signals in the applied number of repeated transmissions.

With the above arrangement, for example, resources used for D2D signal transmission by a user apparatus 2 of a low priority type are decreased, and thus, resources available for D2D signal transmission by a user apparatus 2 of a high priority type can be relatively increased.

Further, in the predetermined communication method, transmission power parameters applied to the corresponding types of the user apparatuses may be different from each other, the determination unit may determine the transmission power parameter applied to the user apparatus, and the transmission unit may transmit a D2D signal based on the applied transmission power parameter.

With the above arrangement, for example, it is possible to cause transmission power of a D2D signal transmitted by a user apparatus 2 of a low priority type to be lower that that of a D2D signal transmitted by a user apparatus 2 of a high priority type, and thus, it is possible to reduce interference with the D2D signal transmitted by a user apparatus 2 of a high priority type by the D2D signal transmitted by a user apparatus 2 of a low priority type.

Further, the control rules may further include information indicating a resource pool, of a plurality of resource pools used for D2D communications, permitted to be used by each type of the user apparatuses, the determination unit may determine the resource pool permitted to be used by the user apparatus, and the transmission unit may transmit a D2D signal by using the resource pool permitted to be used.

With the above arrangement, for example, it is possible to decrease transmission opportunities of a D2D signal transmitted by a user apparatus 2 of a low priority type, and thus, it is possible to secure transmission opportunities of a D2D signal transmitted by a user apparatus 2 of a high priority type.

Further, the obtaining unit may obtain regulation information indicating D2D communication availability, and the transmission unit may not transmit the D2D signal in the case where information indicating that the D2D communications are not permitted is included in the regulation information.

With the above arrangement, it is possible for a mobile communication system according to an embodiment to avoid congestion that occurs in the normal radio communications (cellular communications) performed by a macro cell.

As described above, a mobile communication system according to an embodiment is provided. The mobile communication system supports D2D communications and includes a user apparatus and a base station. The base station includes a transmission unit configured to transmit to the user apparatus control rules including predetermined communication methods applied to corresponding user apparatus types. The user apparatus includes an obtaining unit configured to obtain the control rules from the base station; a determination unit configured to determine which of the predetermined communication methods is to be applied to the user apparatus by comparing a type of the user apparatus and the control rules; and a transmission unit configured to transmit a D2D signal based on the determined predetermined communication method.

A technique is provided by the mobile communication system, which technique appropriately controls D2D communications according to a user apparatus type.

As described above, a communication control method according to an embodiment is provided. The communication control method is performed by a user apparatus used in a mobile communication system in which D2D communications are supported. The communication control method includes obtaining from a base station control rules including predetermined communication methods applied to corresponding user apparatus types; determining which of the predetermined communication methods is to be applied to the user apparatus by comparing a type of the user apparatus and the control rules; and transmitting a D2D signal based on the determined predetermined communication method.

A technique is provided by the communication control method, which technique appropriately controls D2D communications according to a user apparatus type.

Further, the "unit" included in the above apparatuses may be substituted for by "means", "circuit", "device", etc.

Supplementary Description of Embodiment

As described above, embodiments have been described. The disclosed invention is not limited to these embodiments, and a person skilled in the art would understand various variations, modifications, replacements, or the like. Specific examples of numerical values have been used for encouraging understanding of the present invention. These numeric values are merely examples and, unless otherwise noted, any appropriate values may be used. In the above description, partitioning of items is not essential to the present invention. Matters described in more than two items may be combined if necessary. Matters described in one item may be applied to matters described in another item (as long as they do not conflict). In a functional block diagram, boundaries of functional units or processing units do not necessarily correspond to physical boundaries of parts. Operations of multiple functional units may be physically performed in a single part, or operations of a single functional unit may be physically performed by multiple parts. The order of steps in the above described sequences and flowcharts according to an embodiment may be changed as long as there is no contradiction. For the sake of description convenience, the user apparatus 2 and the base station 1 have been described using functional block diagrams. These apparatuses may be implemented by hardware, by software, or by combination of both. The software which is executed by a processor included in a user apparatus 2 according to an embodiment and the software which is executed by a processor included in a base station 1 may be stored in a random access memory (RAM), a flash memory, a read-only memory (ROM), an EPROM, an EEPROM, a register, a hard disk drive (HDD), a removable disk, a CD-ROM, a database, a server, or any other appropriate recording medium.

The present invention is not limited to the above embodiments and various variations, modifications, alternatives, replacements, etc., may be included in the present invention without departing from the spirit of the invention.

It should be noted that, in an embodiment, the obtaining unit 23 is an example of an obtaining unit. The application determination unit 24 is an example of a determination unit. The D2D communication function unit 25 and the signal transmission unit 21 are examples of a transmission unit. The access rules are examples of control rules. The access control unit 14 and the signal transmission unit 11 are examples of a transmission unit.

The present application is based on and claims the benefit of priority of Japanese Priority Application No. 2015-080419 filed on Apr. 9, 2015, the entire contents of which are hereby incorporated by reference.

DESCRIPTION OF THE REFERENCE NUMERALS

1 Base station
2 User apparatus
3 Cell
11 Signal transmission unit
12 Signal reception unit
13 Congestion level obtaining unit
14 Access control unit
21 Signal transmission unit
22 Signal reception unit
23 Obtaining unit
24 Application determination unit
25 D2D communication function unit
101 RF module
102 BB processing module
103 Apparatus control module
104 Communication IF
201 RF module
202 BB processing module
203 UE control module

What is claimed is:

1. A user apparatus used in a mobile communication system in which D2D communications are supported, the user apparatus comprising:
   a receiver that obtains from a base station control rules including a predetermined communication method applied to each of priorities associated with the D2D communications by the user apparatus;
   a processor that selects a resource pool used for the D2D communication based on one of the priorities; and
   a transmitter that transmits a D2D signal by using the selected resource pool based on the predetermined communication method, included in the control rules, applied to the one of the priorities,
   wherein the predetermined communication method is a communication method in which a preset number of repeated transmissions of a same D2D signal is set for each of the priorities,
   wherein the processor determines a preset number of repeated transmissions of a same D2D signal to be applied to the user apparatus, and
   wherein the transmitter repeatedly transmits the same D2D signal with the determined preset number of repeated transmissions.

2. The user apparatus according to claim 1, wherein
   the processor further determines whether the predetermined communication methods are to be applied to the user apparatus by comparing a congestion level of D2D communication resources used for communications by the user apparatus with a predetermined threshold value.

3. The user apparatus according to claim 2,
   wherein the predetermined communication method is a communication method in which resource ranges, of predetermined resource pools used for D2D communications, permitted to be used are set for each of the priorities, wherein the processor selects, of the predetermined resource pools, resources permitted to be used by the user apparatus, and
wherein the transmitter transmits the D2D signal in the range of resources permitted to be used.

4. The user apparatus according to claim 2,
wherein the predetermined communication method is a communication method in which transmission power parameters are set for each of the priorities, and
wherein the processor determines the transmission power parameters to be applied to the user apparatus, and
wherein the transmitter transmits the D2D signal based on the transmission power parameters to be applied.

5. The user apparatus according to claim 2,
wherein the control rules further include information indicating the resource pools, of a plurality of resource pools used for D2D communications, permitted to be used by the corresponding priorities;
the processor determines which of the resource pools is to be permitted to be used by the user apparatus; and
wherein the transmitter transmits the D2D signal by using the resource pool permitted to be used.

6. The user apparatus according to claim 2,
wherein the receiver obtains from the base station regulation information indicating D2D communication availability; and
the transmitter does not transmit the D2D signal in the case where information indicating that the D2D communications are not permitted is included in the regulation information.

7. The user apparatus according to claim 1,
wherein the predetermined communication method is a communication method in which resource ranges, of predetermined resource pools used for D2D communications, permitted to be used are set for each of the priorities,
wherein the processor selects, of the predetermined resource pools, resources permitted to be used by the user apparatus, and
wherein the transmitter transmits the D2D signal in the range of resources permitted to be used.

8. The user apparatus according to claim 7,
wherein the predetermined communication method is a communication method in which transmission power parameters are set for each of the priorities, and
wherein the processor determines the transmission power parameters to be applied to the user apparatus, and
wherein the transmitter transmits the D2D signal based on the transmission power parameters to be applied.

9. The user apparatus according to claim 7,
wherein the control rules further include information indicating the resource pools, of a plurality of resource pools used for D2D communications, permitted to be used by the corresponding priorities;
the processor determines which of the resource pools is to be permitted to be used by the user apparatus; and
wherein the transmitter transmits the D2D signal by using the resource pool permitted to be used.

10. The user apparatus according to claim 7,
wherein the receiver obtains from the base station regulation information indicating D2D communication availability; and
the transmitter does not transmit the D2D signal in the case where information indicating that the D2D communications are not permitted is included in the regulation information.

11. The user apparatus according to claim 1,
wherein the predetermined communication method is a communication method in which transmission power parameters are set for each of the priorities, and
wherein the processor determines the transmission power parameters to be applied to the user apparatus, and
wherein the transmitter transmits the D2D signal based on the transmission power parameters to be applied.

12. The user apparatus according to claim 11,
wherein the control rules further include information indicating the resource pools, of a plurality of resource pools used for D2D communications, permitted to be used by the corresponding priorities;
the processor determines which of the resource pools is to be permitted to be used by the user apparatus; and
wherein the transmitter transmits the D2D signal by using the resource pool permitted to be used.

13. The user apparatus according to claim 11,
wherein the receiver obtains from the base station regulation information indicating D2D communication availability; and
the transmitter does not transmit the D2D signal in the case where information indicating that the D2D communications are not permitted is included in the regulation information.

14. The user apparatus according to claim 1,
wherein the control rules further include information indicating the resource pools, of a plurality of resource pools used for D2D communications, permitted to be used by the corresponding priorities;
the processor determines which of the resource pools is to be permitted to be used by the user apparatus; and
wherein the transmitter transmits the D2D signal by using the resource pool permitted to be used.

15. The user apparatus according to claim 14,
wherein the receiver obtains from the base station regulation information indicating D2D communication availability; and
the transmitter does not transmit the D2D signal in the case where information indicating that the D2D communications are not permitted is included in the regulation information.

16. The user apparatus according to claim 1,
wherein the receiver obtains from the base station regulation information indicating D2D communication availability; and
the transmitter does not transmit the D2D signal in the case where information indicating that the D2D communications are not permitted is included in the regulation information.

17. A user apparatus used in a mobile communication system in which D2D communications are supported, the user apparatus comprising:
an receiver that obtains from a base station control rules including a predetermined communication method applied to each of priorities associated with the D2D communications by the user apparatus;
a processor that selects a resource pool used for the D2D communications based on one of the priorities; and
a transmitter that transmits a D2D signal by using the selected resource pool based on the predetermined communication method, included in the control rules, applied to the one of the priorities,
wherein the predetermined communication method is a communication method in which probabilities of transmitting a predetermined resource block of the D2D signal to be applied to each of the priorities are set, wherein the processor determines the probabilities of transmitting the predetermined resource block of the D2D signal to be applied to the user apparatus, and wherein the transmitter transmits the D2D signal with the determined probabilities of transmitting the predetermined resource block.

18. A mobile communication system, in which D2D communications are supported, comprising: a user apparatus and a base station, wherein the base station includes: a transmitter that transmits to the user apparatus control rules including a predetermined communication method applied to each of priorities associated with the D2D communications by the user apparatus;

the user apparatus includes a receiver that obtains the control rules from the base station;

a processor that selects a resource pool used for the D2D communications based on one of the priorities; and a transmitter that transmits a D2D signal by using the selected resource pool based on the predetermined communication method, included in the control rules, applied to the one of the priorities, wherein the predetermined communication method is a communication method in which a preset number of repeated transmissions of a same D2D signal is set for each of the priorities, wherein the processor determines a preset number of repeated transmissions of a same D2D signal to be applied to the user apparatus, and wherein the transmitter repeatedly transmits the same D2D signal with the determined preset number of repeated transmissions.

19. A communication control method performed by a user apparatus used in a mobile communication system in which D2D communications are supported, the communication control method comprising:

obtaining from a base station control rules including a predetermined communication method applied to each of priorities associated with the D2D communications by the user apparatus;

selecting a resource pool used for the D2D communication based on one of the priorities; and transmitting a D2D signal by using the selected resource pool based on the predetermined communication method, included in the control rules, applied to the one of the priorities, wherein the predetermined communication method is a communication method in which a preset number of repeated transmissions of a same D2D signal is set for each of the priorities, wherein the selecting includes determining a preset number of repeated transmissions of a same D2D signal to be applied to the user apparatus, and wherein the transmitting includes repeatedly transmitting the same D2D signal with the determined preset number of repeated transmissions.

* * * * *